Feb. 18, 1930.  E. L. HUBBARD  1,747,633
LIQUID VENDING AND MEASURING DEVICE
Filed March 29, 1928
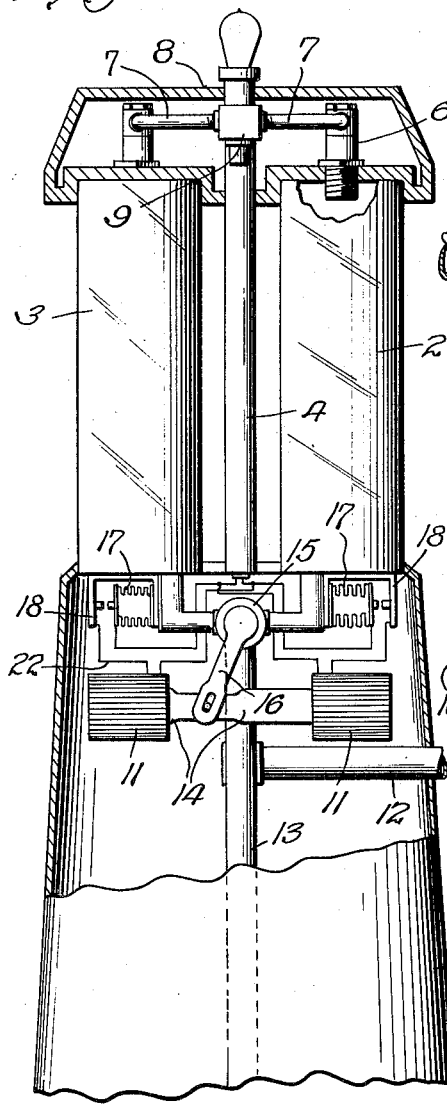
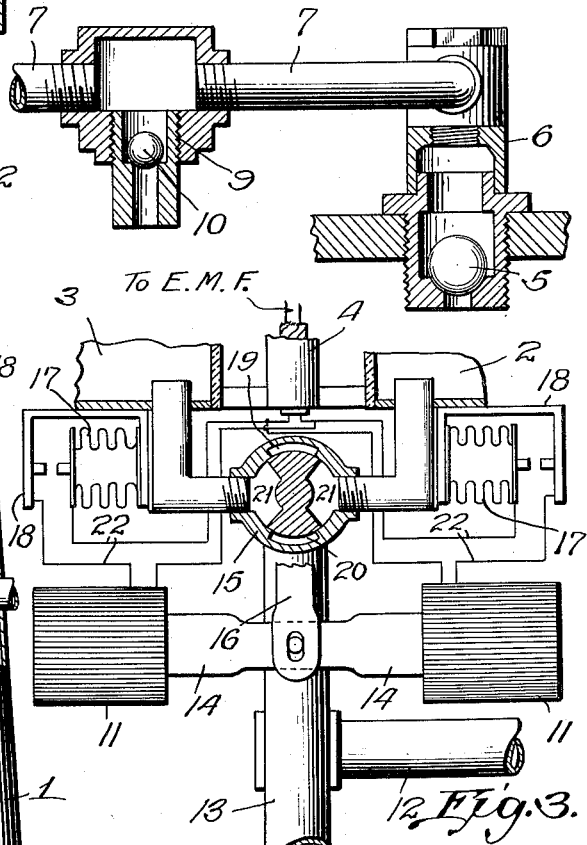
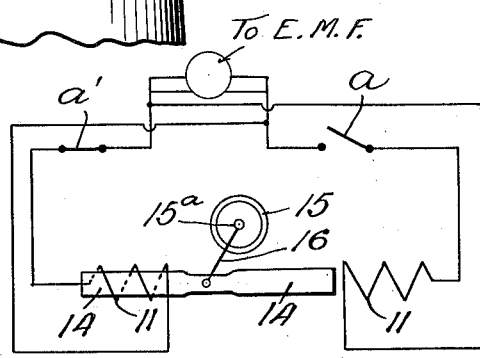
Inventor
Edward L. Hubbard Patented Feb. 18, 1930

1,747,633

UNITED STATES PATENT OFFICE

EDWARD L. HUBBARD, OF PIEDMONT, CALIFORNIA

LIQUID VENDING AND MEASURING DEVICE

Application filed March 29, 1928. Serial No. 265,661.

This invention relates to liquid measuring apparatus as used principally in the dispensing if gasoline at automobile service stations, and the object of the invention is to provide an automatic system and apparatus for liquid dispensing which will be simple, accurate and reliable.

Briefly described my apparatus comprises two measuring cylinders mounted side-by-side upon a suitable stand and alternately filled and emptied by liquid delivered under pressure through a four-way valve.

My invention relates to the method of changing the direction of flow of the liquid through the valve so that the pressure within the full cylinder causes a sylphon to elongate and close an electric circuit which in turn energizes a solenoid whose core is attached to the lever of the four-way-valve and thus controlling it.

In the drawings Fig. 1 is an elevation partly in section, of the upper part of a dispensing device embodying my invention.

Fig. 2 is a sectional detail of the valves in the top of the measuring cylinders.

Fig. 3 is a detailed drawing, partly in section, of the control valve, pressure sylphons and electrically operated solenoids.

Fig. 4 is a schematic diagram of the electric current used.

In further detail the apparatus comprises two cylinders preferably of glass (2 and 3 of Fig. 1) held in place by suitable top and bottom castings bolted together by means of rods, the joints between the glass cylinders and the castings being suitably sealed with cement and a gasket. The two cylinders are joined at the top by a tube 7 through which the air in the filling cylinder is allowed to escape into the emptying cylinder thus assisting the discharge of that cylinder. The detail of this mechanism is shown in Fig. 2 wherein the ball valves 5 in housing 6 allow the air to pass through but stop the liquid. The ball valve in the center, 9 and 10, allows air to enter under atmospheric pressure to the tube 7 but checks it from escaping from the system. Thus when the filling cylinder becomes full the top valve closes and pressure begins to build up within the cylinder. The two cylinders are also joined at the bottom by tubes running through a four-way valve (Fig. 3). These tubes serve for both the inlet and outlet of the liquid as it fills or empties the cylinders. The direction of the flow of the liquid is determined by the position of the 4-way valve of which 15 is the body, 16 the valve arm or lever attached to 15ᵃ the inside or sliding member of the valve, 19 is the outlet port, 20 the inlet port through which is conducted the liquid from its source of supply in a storage tank, 21 are the ports leading to the cylinders.

Suitably mounted on the tubes connecting the lower end of the cylinders are two sylphons, 17. These elongate under the hydraulic pressure within the cylinders and are so set that when the measured quantity is obtained within the cylinder the sylphon attached to that cylinder has elongated sufficiently to make contact with point 18 thus closing an electric circuit.

The four-way valve is operated by electric motive force by means of two solenoids, 11, suitably mounted in relation to the 4-way valve so that the arm, 16, of the valve is slidably connected by rods 14 to the cores of the solenoids. Thus if the left hand cylinder is filled until the left sylphon 17 contacts with point 18 the left hand solenoid 11 is energized by the E. M. F. as shown in the diagram Fig. 4 and the core of that solenoid is drawn to the center of its coil and drawing the arm 16 to the left.

This position allows the left hand cylinder to discharge through exit port 20 and permits the right hand cylinder to fill through the intake port 19, or the wires may be reversed and the action reversed if desired.

The electrical circuits controlling the apparatus are clearly indicated in the figures and do not, I believe, require further explanation. It is understood, of course, that the wiring is suitably insulated away from the mechanism. It will be evident that minor changes may be made within the scope of the disclosure and that the contact point 18 may be adjustable, that the 4-way valve may be of any suitable type and that the sylphons may be mounted at any point where they may enter the cylinder or any pipe leading to it. Any such changes as come within the scope of the disclosure are accordingly included within the appended claims.

I claim:

1. A liquid dispensing mechanism comprising liquid container means, means for supplying liquid to the container means and for withdrawing liquid therefrom, valve means for controlling the second means, electromagnetic means for actuating said valve means and means responsive to pressure existing in the container after the container is filled for energizing said electromagnetic means.

2. Dispensing mechanism as defined in claim 1 in which the valve means is a rotary valve having a handle means connected to said electromagnetic means, whereby when the electromagnetic means is energized and deenergized the container will be alternately connected and disconnected from said means for supplying liquid to said container.

3. Dispensing mechanism as defined in claim 1 wherein the container means comprises two receptacles alternately filled and emptied as the result of the actuation of the valve means by the electromagnetic means as the latter means is energized and deenergized, and wherein said means responsive to pressure is responsive to pressure in each receptacle.

4. Dispensing mechanism as defined in claim 1 wherein the means responsive to pressure existing in the container after the container is filled comprises a sylphon device in communication with the container means and a switch controlling the electromagnetic means whereby the switch will be actuated for the purpose set forth.

EDWARD L. HUBBARD.